United States Patent [19]

Didriksen

[11] Patent Number: 4,635,878
[45] Date of Patent: Jan. 13, 1987

[54] INDEXING MEANS FOR TAPE CASSETTE

[75] Inventor: Neal A. Didriksen, Portola Valley, Calif.

[73] Assignee: Ampex Corporation, Redwood City, Calif.

[21] Appl. No.: 736,409

[22] Filed: May 20, 1985

Related U.S. Application Data

[63] Continuation of Ser. No. 483,315, Apr. 8, 1983, abandoned.

[51] Int. Cl.⁴ .......................... G03B 1/04; G11B 15/32
[52] U.S. Cl. .................................... 242/198; 242/204
[58] Field of Search ................ 242/198, 204, 55.19 A; 360/96.3, 132

[56] References Cited

U.S. PATENT DOCUMENTS

| 3,259,331 | 7/1966 | Liddle | 242/198 X |
| 4,022,401 | 5/1977 | Kishi | 242/198 |
| 4,288,048 | 9/1981 | Sieben | 242/198 |

OTHER PUBLICATIONS

"Ingenious Mechanisms for Designers and Inventors", Franklin Jones, ed., Industrial Press, vol. 1, pp. 55, 57, 63, 65, 1968.

Primary Examiner—John M. Jillions
Attorney, Agent, or Firm—Charles M. Carman; Harry G. Thibault; Joel D. Talcott

[57] ABSTRACT

A tape cassette has a springloaded indexing mechanism to urge the cassette reels in a tape winding directions so as to tension the free run of tape between the reels whenever the cassette is removed from the tape transport machine.

4 Claims, 3 Drawing Figures

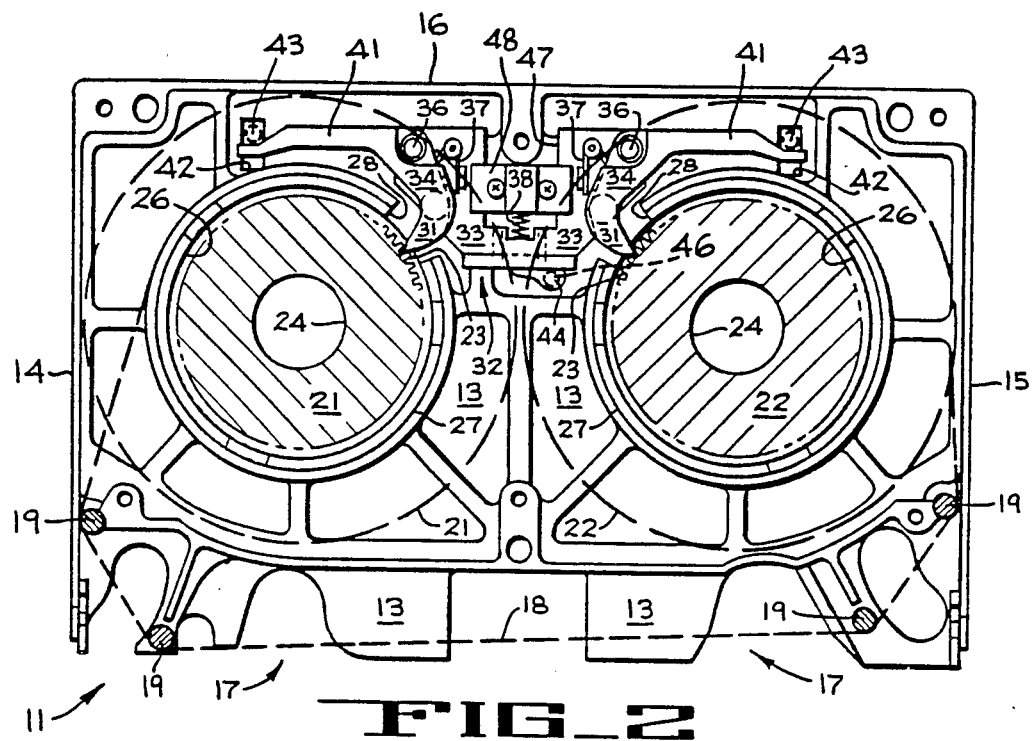
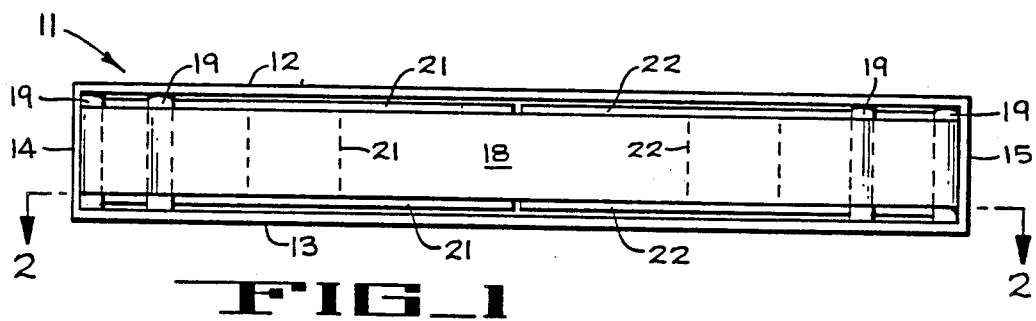
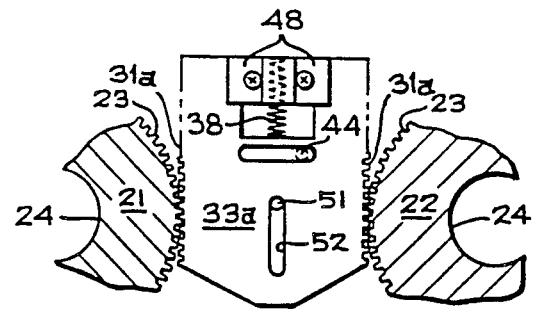

INDEXING MEANS FOR TAPE CASSETTE

The Government has rights in this invention pursuant to Contract No. F33657-81-C-1032 awarded by the United States Government.

This application is a continuation of application Ser. No. 483,315, filed Apr. 8, 1983 abandoned.

BACKGROUND OF THE INVENTION

This invention relates to tape cassettes, and particularly to means for maintaining tape tension when the cassette is removed from the transport machine.

Tape cassettes usually contain two reels with tape coiled thereon so as to present a free run of tape between the reels, this run being accessible along one side of the cassette that is either open or has a cover door that can be opened when the cassette is inserted into a tape transport machine (e.g., a magnetic tape recording, playing and rewinding machine). Usually also, the sides of the cassette adjacent and orthogonal to the open side have smaller openings for the lateral insertion of a capstan, play-record and erasing heads, and various guides, all of which are part of the transport machine but must engage the tape on the side thereof that faces toward the interior of the cassette. If the free run of tape is too loose, it may drop too far back into the cassette so that the capstan and other such elements fail to pass behind the free tape run and the machine cannot function to transport and record or play the tape; conversely, if the loose run of tape falls too far out of the cassette while it is being loaded, the tape may become tangled in the transport interior mechanism and other malfunctions will result. Also, if the reels are loose when the cassette is being shipped or handled outside the transport machine, then vibrations or other sudden jolts may cause the tape coils to unwind somewhat and sag into conical shapes, resulting in immediate or eventual tape edge damage and later guiding malfunctions in the transport machine.

Previously in the art it has been attempted to control this problem by arranging springloaded friction brakes or pawl-and-pinion combinations within the cassette to lock or restrain the reels in the positions that they occupy at the moment the cassette is withdrawn from the transport machine; and portions of the transport mechanism are arranged to engage the pawls directly or indirectly as the cassette is loaded into the transport to cause the pawls to retract and free the reels while the cassette remains in the machine-loaded condition. Such an arrangement is shown in U.S. Pat. No. 3,900,172, in which the cassette cover door is opened automatically by mechanism within the transport as the cassette is loaded, and the door in turn retracts the pawls that engage pinion gear teeth on the cassette reels.

Such arrangements are limited, however, to perpetuating the tape tension or tape slack conditions that exist at the moment when the cassette is removed from the machine, and the run of tape at the open side of the cassette may still be too loose for proper functioning at the time of the next subsequent insertion. Nothing positive is done to ensure that the tape is actually placed under tension if it is not already in tensioned condition.

Therefore it is an object of the present invention to ensure that the tape is always under tension when the cassette is removed from the transport machine.

BRIEF DESCRIPTION OF THE INVENTION

This and other objects are achieved in a cassette having a springloaded indexing mechanism to urge the reels in a tape winding direction so as to positively tension the free run of tape between the reels whenever the cassette is removed frow the transport machine.

DESCRIPTION OF THE DRAWINGS

FIG. 1 is an open-side elevation view of a tape cassette showing the free run of tape between the reels;

FIG. 2 is a plan view of the cassette of FIG. 1 with the top cover removed and taken partly in cross-section along the plane 2—2 of FIG. 1; and FIG. 3 is a fragmentary view showing a variational form of the mechanism illustrated in FIG. 2

DESCRIPTION OF THE PREFERRED EMBODIMENTS

FIGS. 1 and 2 show a generally rectangular cassette 11 having a top 12, bottom 13, end walls 14 and 15, a back wall 16, and an open front side 17 at which a free tape run 18 is presented as by means of guides 19. The tape is coiled in opposite directions on a pair of reels 21, 22, the hubs and flanges of which show only in phantom in FIG. 2, but each reel has a lower concentric extension formed as a pinion gear with gear teeth 23 and a central arbor hole 24 for impalement on respective mounting arbors of the tape transport machine (not shown); these pinion extensions show in cross-section in FIG. 2.

Whenever the cassette is not in the transport machine, the reels 21, 22 are loosely positioned in the cassette by means of the extensions bearing pinion teeth 23, portions of the extensions extending downwardly through openings 26 in the bottom wall 13 of the cassette; each of the openings 26 is circumvallated by a raised rib 27, which is arranged to bear against and support the bottom flange of the respective reel. Each rib 27 has an opening 28 for the insertion of a tooth portion 31 of a rack assembly 32 comprising a carrier member 33 on which are pivoted two pawls 34 as by means of pivot pins 36. The teeth 31 are actually formed on the pawls 34, and the pawls are springloaded as by springs 37 to be urged in the direction of engagement with the respective pinion teeth 23 of the reels. The rack carrier member 33 is mounted for sliding motion in a direction perpendicular to the plane joining and containing the two reel axes, and along a path that is midway between the reels, and is springloaded as by a compression spring 38 to carry the pawls 34 into engagement with the pinion teeth 23 and to load each of the reels in a winding direction to positively tension the tape run 18.

Each of the pawls 34 has an arm 41 extending to a position at which openings 42 are provided in the bottom wall 13 of the cassette for access by a pair of key elements 43 from the transport mechanism, and for movement of the keys 43 in a downward direction (i.e., toward the bottom of the drawing of FIG. 2) to cause retraction of the pawl teeth 31 from the pinion teeth 23 in a radial direction that has at least a directional component parallel to the plane of the reel axes. Compounded with this motion, the rack carrier member 33 is caused to move upwardly (i.e., toward the top of the drawing of FIG. 2) as by means of a pivoting key pin 44 extending from the transport mechanism and riding in an opening 46 in the cassette bottom 13. The carrier member 33 also has a central opening 47 by which the member rides in sliding motion on a pair of track bolts, which also serve to retain a retaining plate 48 that partly overlies and guides the member 33 in its sliding motion, and serves also to assist in retaining one end of the spring 38.

For some purposes, the rack and pinion combination may be arranged in simpler form, as shown for example in FIG. 3, in which a rack plate 33a is arranged for the same springloaded and pin retractable rectilinear motion as the member 33 of FIG. 2; and the plate 33a has one more guide 51 extending from the cassette bottom wall and riding in a slot 52 in the plate 33a. A pair of rectilinear arrays of rack gear teeth 31a are formed on the sides of the plate 33a to engage the pinion teeth 23 and load the reels in the tape winding direction. The advantage of the arrangement of FIG. 3 is the simpler structure, without need for the pawls 34 or the transport keys 43. However, the arrangement of FIG. 3 does require a much longer path of motion for the plate 33a to ensure both adequate loading of the reels and tensioning of the tape in one direction, together with adequate retraction to completely clear the teeth 23 in the other direction; and if the reels fit too loosely in the cassette, there may be risk that the teeth of plate 33a may slip out of engagement with the pinion teeth 23. For the use contemplated for the actual invention as constructed, the arrangement of FIG. 2 has been found to provide more security of operation in a more compact form.

What is claimed is:

1. A tape cassette reel-locking and tape tensioning mechanism, comprising:
    means mounted in said cassette for securing a tangentially extending portion of said tape;
    first reel-engaging means movably mounted in said cassette;
    second means movably mounted in said cassette for moving said reel-engaging means in a first non-radial direction for engaging and rotating a reel disposed in the cassette with said extending tape portion tensioned between said reel and said securing means; and
    third means movably provided in said cassette and movable with respect to said first reel-engaging means for cooperating with said second means for moving said reel-engaging means in a second radial direction of said reel and away therefrom, so as to have at least a component of movement orthogonal to said first non-radical direction, and so as to produce a compound motion of said first and second means such that said first means moves at the latest concurrently with said second means to release said reel for operation, without moving said reel in the unwinding direction, and without positively causing slack to appear in said tape segment.

2. A reel-locking and tape tensioning mechanism for a tape cassette containing two reels arranged on parallel axes lying in a common plane, comprising:
    first reel-engaging means movably mounted in said cassette;
    second means movable mounted in said cassette for moving said reel-engaging means in a first non-radial direction perpendicular to the plane of the reel axes for engaging and rotating said reels each in a winding direction of said tape and for locking said reels in an inoperative mode, said tape being mounted on said reels with an extending tape portion tensioned between said reels; and
    third means movably provided in said cassette in at least an operative mode thereof and movable with respect to said first reel-engaging means for cooperating with said second means for moving said reel-engaging means each in a second radial direction of the corresponding reel and away therefrom, so as to have at least a component of movement perpendicular to the plane of the reel axes, and so as to produce a compound motion of said first and second means such that said first means moves at the latest concurrently with said second means to release said reel for operation, without moving said reel in the unwinding direction, and without positively causing slack to appear in said tape segment.

3. A tape cassette of the type having a housing mounting at least one tape reel, wherein:
    means are provided for securing a tangentially extending portion of said tape and for engaging and loading said reel in the tape-winding direction for tensioning said tape portion;
    said means being accessible from outside said housing for releasing said securing, engaging and loading means without moving said reel in the tape unwinding direction, so as to free said reel and tape for operation;
    said means for securing said tangentially extending portion of said tape comprising another reel also mounted in said housing, and to which said tape is secured, and means for engaging and loading said other reel in the tape-winding direction, said last named means also being accessible from outside said housing for releasing said other reel engaging and loading means without moving said other reel in a tape-unwinding direction;
    said loading means including rack means engaging pinion portions of both reels and mounted for tangential movement with respect to said pinion portions so as to urge both pinion portions in the respective tape-winding directions thereof;
    said tangentially moving rack means is arranged to move in a direction that is perpendicular to a plane containing the axes of both reels;
    the portions of said tangentially moving means that engage said pinion portions of said reels being arranged to move only in a zone that is remote from said plane of the reel axes, said reel-engaging portions being adapted to move also in directions that are perpendicular to said plane;
    said reels being arranged to rotate in opposite directions for winding, and said tangentially moving rack means including a carrier member mounted for track guided sliding movement perpendicular to said axial plane and midway between said reel axes, said carrier member being springloaded to normally urge said reels in winding direction, and said reel engaging portions are pawls mounted for pivoting motion on said carrier member and springloaded with respect thereto in directions to engage said respective pinion portions in substantially radial directions of said reels and to assist in urging said reels in the winding direction;
    said housing being provided with a first opening for access to retract said carrier member against the springloading thereof; and
    said housing also being provided with a pair of second openings for access to retract said pawls against the springloadings thereof;

wherein said pawls may be retracted in a motion having a compound relation to the motion of said carrier member such that said pawls are radially disengaged from said pinion portions of said reels, at the latest concurrently with the retraction of said carrier member to avoid moving said reels in the tape unwinding directions thereof.

4. A cassette as recited in claim 3, wherein said pinion reel portions are provided with gear teeth, and said pawls are shaped to engage said gear teeth to cause simultaneous indexing movement of both reels in the winding direction so as to tension said tape between the reels.

* * * * *